United States Patent [19]

Ferrara

[11] 4,191,417
[45] Mar. 4, 1980

[54] VEHICLE SEAT
[75] Inventor: Rudolph A. Ferrara, Warren, Mich.
[73] Assignee: General Motors Corporation, Detroit, Mich.
[21] Appl. No.: 919,803
[22] Filed: Jun. 28, 1978
[51] Int. Cl.² .............................................. A47C 1/02
[52] U.S. Cl. ................................... 296/65 R; 296/69
[58] Field of Search ................... 296/65 R, 63, 69; 297/316–322

[56] References Cited
U.S. PATENT DOCUMENTS 3,246,347  4/1966  Mason ..................................... 296/69
3,982,787  9/1976  Moll ....................................... 296/65 R Primary Examiner—Philip Goodman
Attorney, Agent, or Firm—Dean L. Ellis

[57] ABSTRACT

An automotive vehicle seat which is convertible to a folded cargo configuration includes a seatback pivotable about its lower edge to lie flat and form a cargo floor extension over the area occupied by the seat bottom. The seat bottom includes separate main pelvic support and high bolster portions on the vehicle floorpan and the high bolster portion is swingable from its normal position adjacent the main portion to a stowed position permitting the seatback to be foldable into the seat bottom space. Latch means between the seatback and bolster portion hold the same in their cargo position and the bolster portion is spring-urged to normal position.

3 Claims, 4 Drawing Figures

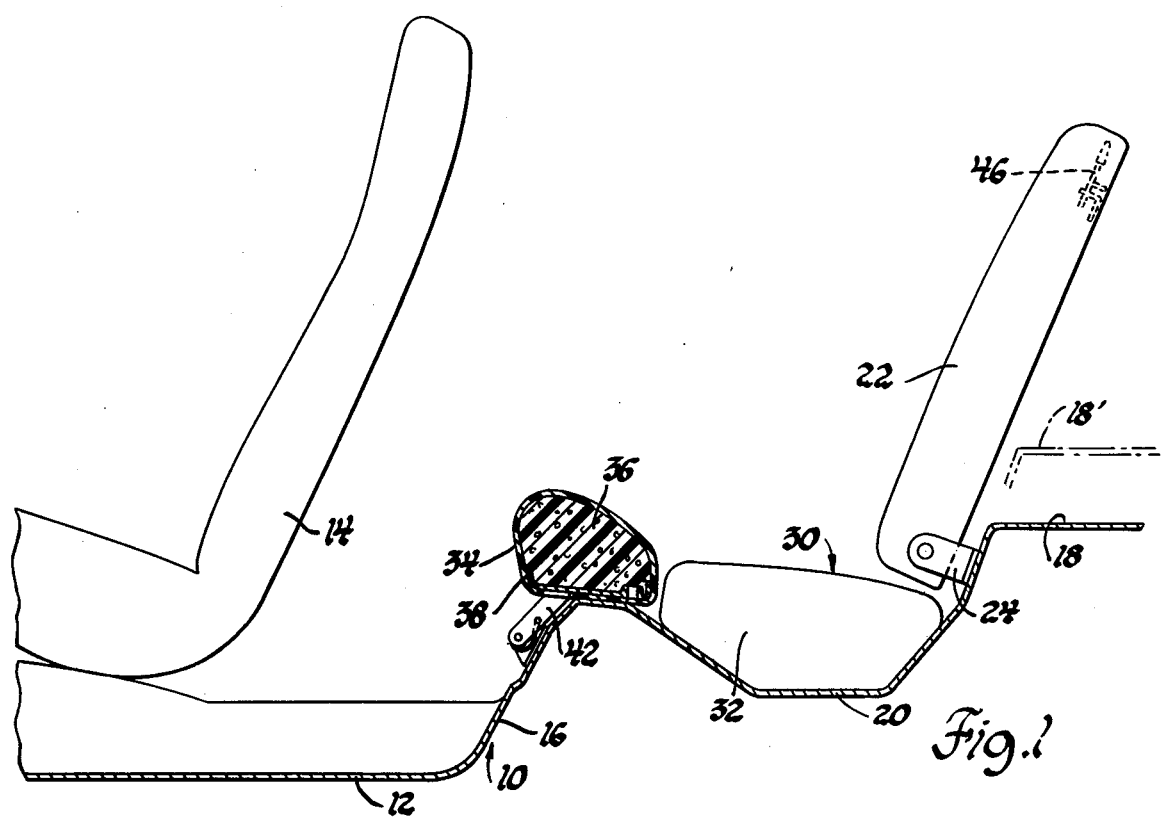
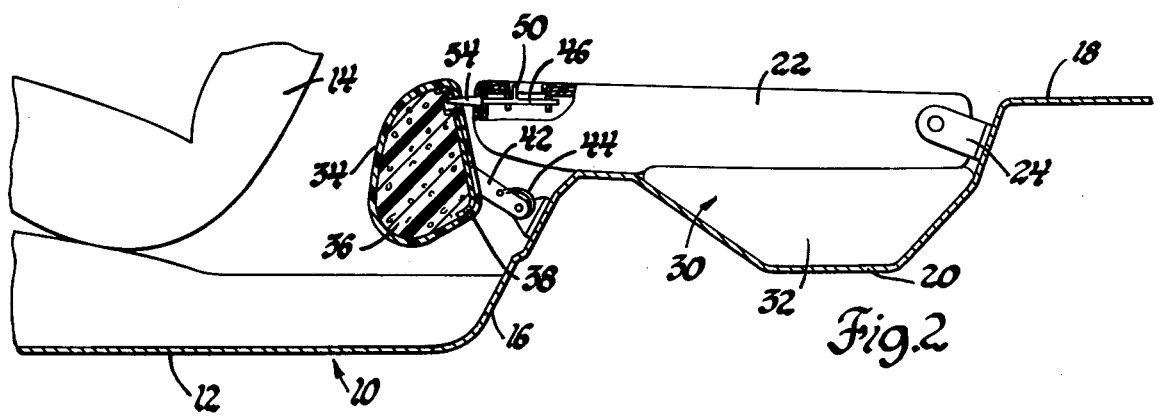
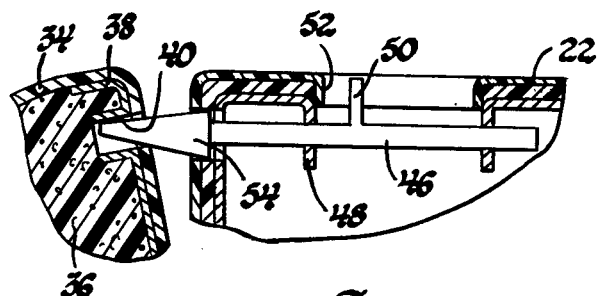
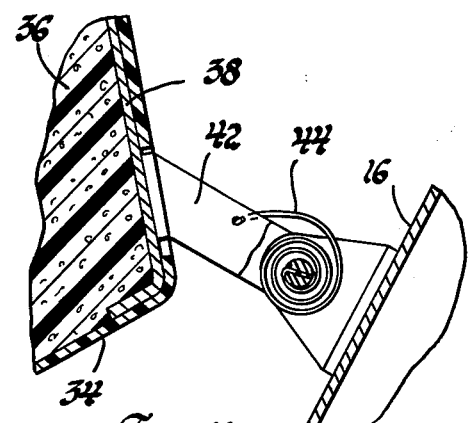

ns which are convertible into a cargo floor configuration.

VEHICLE SEAT

This invention relates to automotive vehicle seat constructions and most particularly to seat constructions which are convertible into a cargo floor configuration.

The general down-sizing trend in domestic automotive vehicles, complicated by the designer's imperatives on retention of traditional passenger comfort and convenience, is a challenge to the use of known seating constructions of the type in which a rear seat is convertible from a normal seating configuration to a cargo load floor-extending configuration. This is so since station wagons, hatchbacks and similar vehicle bodies having such rear seats are being designed with increased interior cargo capacity through the expedient of a lowered cargo floor. The lowered cargo floor robs from the normal space into which conventional convertible or foldable rear seat constructions may be fitted.

The present invention solves the noted difficulties in providing a seat construction which may be packaged within the diminished seat space and without sacrifice of other normal usable cargo space and without requiring, as has been proposed, complete removal of vehicle seat cushions or seatbacks from the vehicle interior for storage elsewhere.

In an illustrative embodiment, a moderately pitched seat bottom; i.e., one rising from seat rear to seat front, is constructed of distinct thigh-supporting bolster and pelvic-supporting main portions. The bolster portion is mounted swingably on the vehicle underbody so as to be stowable from a normal seating surface position adjacent the main portion of the seat bottom, to a remote position which vacates space for the thicker portions of the seatback when the latter is folded flat over the seat bottom area. In its stowed position, the seat bolster takes no space primarily usable as cargo area in that it is disposed at or below the plane of the cargo floor.

The foregoing and other objects, features and advantages of the invention will be readily apparent from the following specification and from the drawings wherein:

FIG. 1 is an elevational view, partially in section, of a vehicle body interior including a vehicle seat according to this invention shown in a normal condition;

FIG. 2 is a view similar to FIG. 1 showing the seat converted to a cargo floor-extending condition;

FIG. 3 is an enlarged fragmentary view of a portion of FIG. 2; and

FIG. 4 is an enlarged fragmentary view of another portion of FIG. 2.

Referring now particularly to FIG. 1 of the drawings illustrating a preferred embodiment of the vehicle seat according to this invention, a vehicle body designated generally by the numeral 10 includes an underbody or floorpan member 12 having a generally flat forward portion suitable for mounting thereupon of a forward passenger or driver seat 14. Immediately rearward of seat 14, the floorpan extends flat and rises abruptly into a footwell portion 16 defining a rear seat footwell. Rearward of these areas, a cargo floor 18 is formed in the floorpan. In keeping with current dictates for increased cargo room, such cargo floor is substantially lowered relative to the ground datum line, from that which has occurred in past practice and which is generally represented by the higher floor level shown by broken lines 18'.

A convertible vehicle seat construction according to this invention is placed in a seat support portion 20 of floorpan 12 between the footwell 16 and cargo floor 18. The vehicle seat includes a seatback 22 pivoted at its lower edge on the seat support portion 20 by brackets 24 in such fashion that the seatback may be easily manually swung between the upright position shown in FIG. 1 and a generally horizontal position, shown in FIG. 2, in which the normally rearwardly facing surface of the seatback provides an extension of cargo floor 18. Releasable latch means may be provided to hold the seatback upright as is well known.

A seat bottom or cushion, designated generally as 30, is further mounted on the seat support portion 20 of the floorpan and comprises individual main and bolster portions 32 and 34, respectively. In the condition shown in FIG. 1, the two portions of the seat bottom 30 present overall a conventional seating surface having an upward pitch from seat rear to the seat front or high bolster portion of the seat bottom. The pitch from the high bolster affords optimum utilization of existing passenger space for seating comfort, particularly in terms of adequate thigh support. However, it is readily seen that no room exists to accept seatback 22 in a horizontal attitude at the lowered level of cargo floor 18.

Separation of the seat bottom 30 into portions still requires attention to suitable load bearing capability and the main portion 32, which is for pelvic or buttock support, has thick dimensions to accommodate adequate springing or thickness of polymeric foam material for its required higher load capacity. To achieve this and still meet the objects of the invention, main portion 32 may be situated in a formed depression of seat support portion 20, as shown. Bolster portion 34 is located high with respect to main portion 32 and provides thigh support. It is comprised, in the present illustrative case, of a body of polymeric foam 36 bonded or otherwise affixed to a dish-shaped supporting pan 38 of metal or rigid polymer, with suitable trim material or fabric enveloping the whole of the bolster and such fabric, of course, being coordinated with like trim over portion 32 and seatback 22. An aperture 40 is provided within such trim fabric and support pan 38 for a purpose later to appear.

Suitable pivot means in the form of bracket legs 42 affixed to support pan 38 connect with pivot supports mounted to footwell portion 16 of the floorpan and these bracket legs afford swinging of bolster portion 34 out of its normal seating position, FIG. 1, to a stowed position remote from main portion 32, as shown in FIG. 2.

Referring to FIG. 4, coil torsion springs 44 may be associated with the bracket legs 42 and coiled about the pivot studs of the support brackets to urge the bolster portion 34 in a clockwise direction from its stowed position to its normal seating position of FIG. 1. As seen in that Figure, my preferred embodiment has the bolster portion 34 simply resting its bottom surface directly upon an elevated section of seat support portion 20 of the floorpan when in normal position. In this way, simple pivot bracketry of legs 42, etc., will suffice, and no additional positive locating structure is necessary. It will be appreciated that alternative pivot bracketry and locating means might be employed.

When it is desired to convert the vehicle seat to a cargo floor extension condition, bolster portion 34 is manually swung forwardly against the action of springs 44 to its position of FIG. 2, stowed remotely from main portion 32. Seatback 22 may then be swung forwardly and downwardly to occupy the space vacated by the bolster portion and lie flat or generally horizontal as an extension of cargo floor 18.

Latch means may be provided in the seatback 22 and the cooperating aperture 40 to hold the bolster portion and seatback in their converted cargo condition of FIG. 2. Specifically, a latch bolt 46, best seen in FIG. 3, may be slidably mounted in a bolt support 48 within the seatback and including a finger portion 50 movable within a finger recess 52 of the seatback. The bolt is movable by the fingers from a withdrawn position indicated in FIG. 1 to a latching position, seen in FIGS. 2 and 3, wherein a bolthead 54 protrudes from the seatback to register within aperture 40 of the bolster portion. Such interengagement or registry partakes of the clockwise bias from springs 44 on the bolster portion as well as any compression of the cushions of main portion 32 and seatback 22, to hold both the bolster portion and seatback 22 in their converted cargo positions. For release of the latch, the bolthead may be withdrawn by use of finger portion 50 or alternatively the bolster 34 may be rotated counterclockwise by hand to remove the bolthead from the aperture 40, whereupon the seatback and bolster may be urged and manually returned to their normal positions of FIG. 1.

While a preferred embodiment has been described and illustrated, it is to be appreciated that alternative forms of movable mounting of bolster portion 34 may be employed without departing from the spirit of the invention. Multiple pivot linkage and positive stops may be found preferable to simple pivot brackets as explained above, or sliding displacement of the bolster portion may be found preferable in some instances, depending upon floorpan configuration. In all cases, it is seen that the bolster portion is to be conveniently removed to an area such as within the rear seat footwell where the bolster portion provides no interference to full use of the entire horizontal expanse rearward of forward seat 14. Thus, articles of cargo may be pushed forwardly over seatback 22 and bolster 34 directly up against the back of seat 14 and there is no sacrifice of that triangular area defined by the rear profile of seat 14. Maximum utilization of the volume of the rear cargo area of the vehicle is thus realized. Most importantly, such volume is increased by a lowered cargo floor yet a conveniently usable convertible seat may be provided.

The embodiments of the invention in which an exclusive property or privilege is claimed are defined as follows:

1. In an automotive vehicle body, said body including a seat structure of the type including a seat cushion rising from seat rear to seat front and conventionally providing full pelvic and at least partial thigh support, the improvement comprising, said seat cushion having separate main and bolster portions, said main portion being mounted stationary on the vehicle body and providing the full pelvic support, said bolster portion providing said at least partial thigh support, and means mounting said bolster portion on the vehicle body for movement relative to said main portion between a normal condition lying adjacent and higher than said main portion so as to provide therewith said conventional full pelvic and at least partial thigh support rising from seat rear to seat front, and a stowed condition displaced to a position remote from said main portion.

2. In a vehicle body, a vehicle seat comprising: a seatback; a seat bottom, said seat bottom including a main portion mounted on the vehicle body and adapted for pelvic support primarily, and a bolster portion adapted for thigh support primarily; means swingably mounting said bolster portion on the vehicle body for movement relative to said main portion between a normal position lying adjacent said main portion so as to present therewith a conventional full pelvic and thigh seating surface and a stowed position remote from said main portion; and means swingably mounting said seatback on the vehicle body for movement between an upright position and a cargo position folded to overlie the seat bottom main portion and occupy the space formerly occupied by said bolster portion when the latter is swung from said normal position thereof.

3. In a vehicle body including a floorpan formed with adjacent footwell and seat support areas, a vehicle seat comprising: a seatback; means mounting said seatback on the vehicle body for swinging movement between an upright position and a folded cargo position overlying the seat support area of the floorpan; a seat bottom, said seat bottom including a main portion for pelvic support primarily and mounted on the floorpan seat support area, and a bolster portion adapted for thigh support primarily; pivot means on the floorpan mounting said bolster portion for swinging movement between a normal position resting on said floorpan seat support area adjacent said main portion to define a conventional full seating surface therewith, and a stowed position located in said footwell area remote from said main portion, means biasing said bolster portion to the normal position thereof, said seatback in the folded cargo position thereof lying adjacent the stowed bolster portion and occupying the space normally occupied thereby, and latch means on said seatback and bolster portion interengageable to hold said seatback in folded and said bolster portion in stowed positions respectively.

* * * * *